United States Patent
Fujimoto et al.

(10) Patent No.: US 12,494,323 B2
(45) Date of Patent: Dec. 9, 2025

(54) MULTI-LAYER CERAMIC CAPACITOR AND METHOD FOR PRODUCING THE SAME

(71) Applicant: YAGEO CORPORATION, Kaohsiung (TW)

(72) Inventors: Masayuki Fujimoto, Kaohsiung (TW); Kai-Hsun Yang, Kaohsiung (TW); I Kuan Cheng, Kaohsiung (TW)

(73) Assignee: YAGEO CORPORATION, Kaohsiung (TW)

( * ) Notice: Subject to any disclaimer, the term of this patent is extended or adjusted under 35 U.S.C. 154(b) by 100 days.

(21) Appl. No.: 18/176,492

(22) Filed: Mar. 1, 2023

(65) Prior Publication Data

US 2024/0177937 A1    May 30, 2024

(30) Foreign Application Priority Data

Nov. 24, 2022 (CN) .......................... 202211484782.1

(51) Int. Cl.
*H01G 4/30* (2006.01)
*H01G 4/008* (2006.01)
(Continued)

(52) U.S. Cl.
CPC ............. *H01G 4/306* (2013.01); *H01G 4/008* (2013.01); *H01G 4/012* (2013.01);
(Continued)

(58) Field of Classification Search
CPC ........ H01G 4/306; H01G 4/008; H01G 4/012; H01G 4/1272; H01G 4/232; H01G 4/248; H01G 13/006; H10D 1/045; H10D 1/64
(Continued)

(56) References Cited

U.S. PATENT DOCUMENTS 9,701,586 B2   7/2017 Fujimoto
2006/0208575 A1*  9/2006 Orimo ...................... H01G 4/30
                                                      307/109
(Continued)

FOREIGN PATENT DOCUMENTS

CN    114864281 A    8/2022
CN    115249583 A    10/2022
(Continued)

OTHER PUBLICATIONS

Yoshiki Iwazaki et al., "Artificial SrTiO3/SrO Superlattices by Pulsed Laser Deposition," Jpn. J. Appl. Phys., Dec. 1, 1999, pp. L1443-L1446, vol. 38.
Shoichiro Suzuki et al., "Effect of alloying Ni inner electrodes on the leakage current degradation of BaTiO3-based multilayer ceramic capacitors," Applied Physics Letters, Apr. 1, 2020, pp. 132903-1~132903-4, vol. 116.
(Continued)

*Primary Examiner* — Arun Ramaswamy
(74) *Attorney, Agent, or Firm* — CKC & Partners Co., LLC

(57) ABSTRACT

The present application relates to a multi-layer ceramic capacitor and a method for producing the same. Internal electrode layers and ceramic dielectric layers are firstly formed, and the internal electrode layers and the ceramic dielectric layers are alternately laminated to form a laminated stack. The internal electrode layers are formed from specific metal particles. Next, a sintering process is performed to the laminated stack to form a laminated ceramic body, and then end electrodes are formed on two ends of the laminated ceramic body, thereby producing the multi-layer ceramic capacitor of the present application with excellent continuity of the internal electrode and better capacitor properties and reliability.

3 Claims, 7 Drawing Sheets

(51) Int. Cl.

| | |
|---|---|
| *H01G 4/012* | (2006.01) |
| *H01G 4/12* | (2006.01) |
| *H01G 4/232* | (2006.01) |
| *H01G 4/248* | (2006.01) |
| *H01G 13/00* | (2013.01) |
| *H10D 1/00* | (2025.01) |
| *H10D 1/64* | (2025.01) |

(52) U.S. Cl.
CPC ........... *H01G 4/1272* (2013.01); *H01G 4/232* (2013.01); *H01G 4/248* (2013.01); *H01G 13/006* (2013.01); *H10D 1/045* (2025.01); *H10D 1/64* (2025.01)

(58) Field of Classification Search
USPC .................. 361/301.4, 321.1, 306.3, 303
See application file for complete search history.

(56) References Cited

U.S. PATENT DOCUMENTS

| | | | |
|---|---|---|---|
| 2013/0135789 A1* | 5/2013 | Kim | H01G 4/12 29/25.42 |
| 2016/0181019 A1* | 6/2016 | Park | H01G 4/12 361/301.4 |
| 2017/0022608 A1 | 1/2017 | King et al. | |
| 2017/0025222 A1* | 1/2017 | Park | H01G 4/1209 |
| 2019/0009330 A1 | 1/2019 | King et al. | |
| 2019/0304695 A1 | 10/2019 | Kim et al. | |
| 2021/0023616 A1 | 1/2021 | King et al. | |

FOREIGN PATENT DOCUMENTS

| | | |
|---|---|---|
| JP | H11-45617 A | 2/1999 |
| JP | 2009-32837 A | 2/2009 |
| JP | 2011-210826 A | 10/2011 |
| JP | 2011-211058 A | 10/2011 |
| JP | 2013-135096 A | 7/2013 |
| JP | 5488725 B2 | 5/2014 |
| JP | 2014-229567 A | 12/2014 |
| JP | 5757319 B2 | 7/2015 |
| JP | 5892252 B2 | 3/2016 |
| JP | 2021-15925 A | 2/2021 |
| TW | 512372 B | 12/2002 |
| TW | 200418051 A | 9/2004 |
| TW | 201936843 A | 9/2019 |
| WO | 2020/090415 A1 | 5/2020 |
| WO | 2021/182452 A1 | 9/2021 |
| WO | 2021/199694 A1 | 10/2021 |

OTHER PUBLICATIONS

Shoichiro Suzuki et al., "Suppressive effect of Ni—Sn internal electrode at the anode on the leakage current degradation of BaTiO3-based multilayer ceramic capacitors," Applied Physics Letters, Mar. 3, 2021, pp. 112904-1~112904-4, vol. 118.

Anton V. Polotai et al., "Utilization of Multiple-Stage Sintering to Control Ni Electrode Continuity in Ultrathin Ni—BaTiO3 Multilayer Capacitors," Journal of the American Ceramic Society, Dec. 2007, pp. 3811-3817, vol. 90, No. 12.

Clemens Schmetterer et al., "A new investigation of the system Ni—Sn," Intermetallics, Dec. 22, 2006, pp. 869-884, vol. 15.

F. F. Lange, "De-sintering, A Phenomena Concurrent with Densification Within Powder Compacts: A Review," Sintering Technology, 1996, pp. 1-12, CRC Press.

Ken-ichi Sugimura et al., "Effect of a BaTiO3 nanoparticle additive on the quality of thin-film Ni electrodes in MLCC," Journal of the Ceramic Society of Japan, 2009, pp. 1039-1043, vol. 117 No. 9.

James Kane et al., "Chemical Vapor Deposition of Antimony-Doped Tin Oxide Films Formed from Dibutyl Tin Diacetate," J. Electrochem. Soc., Feb. 1976, pp. 270-277, vol. 123, No. 2.

B. Jayant Baliga et al., "The Preparation and Properties of Tin Oxide Films Formed by Oxidation of Tetramethyltin," J. Electrochem. Soc., June 1794, pp. 941-944, vol. 123, No. 6.

A. Rohatgi et al., "Electrical and Optical Properties of Tin Oxide Films," Journal of The American Ceramic Society, Jun. 1794, pp. 278-279, vol. 57, No. 6.

Hasuck Kim et al., "Composition and Conductivity of Tin Oxide Films Prepared by Pyrohydrolytic Decomposition of Tin (IV) Compounds," Journal of The American Ceramic Society, Jan.-Feb. 1975, pp. 23-25, vol. 58, No. 1-2.

Hideo Watanabe, "Preparation of SnO2 Films by Oxydizing Evaporated Sn Films," Japan. J. Appl. Phys., 1970, pp. 1551-1552, vol. 9.

H. W. Lehmann et al., "Preparation and properties of reactively co-sputtered transparent conducting films," Thin Solid Films, 1975, pp. 359-368, vol. 27.

D. E. Carlson, "The Deposition of Tin Oxide Films from a D-C Glow Discharge," J. Electrochem. Soc., Oct. 1975, pp. 1334-1337, vol. 122, No. 10.

Ken-ichi Sugimura et al., "Preparation of Ni/BaTiO3 Core-Shell Particle by Spray Drying Process," J. Soc. Powder Technol, Japan, 2009, pp. 813-818, vol. 46, No. 11.

Masayuki Fujimoto et al., "Microstructure of SnO2 Conductive Film Prepared by Pyrohydrolytic Decomposition onto a Glass Substrate," Japanese Journal of Applied Physics, Apr. 1988, pp. 534-539, vol. 27, No. 4.

\* cited by examiner

MULTI-LAYER CERAMIC CAPACITOR AND METHOD FOR PRODUCING THE SAME

RELATED APPLICATIONS

This application claims priority to China Application Serial Number 202211484782.1, filed Nov. 24, 2022, which is herein incorporated by reference in its entirety.

BACKGROUND

Field of Invention

The present application relates to a multi-layer ceramic capacitor. More particularly, a multi-layer ceramic capacitor with high continuity of the internal electrode and a method for producing the same are provided.

Description of Related Art

With advancements of technology, requirements of capacitors for electronic products are more and more stringent, and with a developing trend for thinner and lighter, dimensions of the capacitors tend to much smaller. In order to meet the requirements of dimensions and capacitance characteristics, a multi-layer ceramic capacitor (MLCC) with multi-layer metal electrode sheets has been vigorously developed. Because electric energy storage materials of the multi-layer ceramic capacitor are laminated as a comb-shaped structure, the multi-layer ceramic capacitor has a larger electrode area in a same volume. Therefore, the multi-layer ceramic capacitor provides better capacitance characteristics, thereby meeting the application requirements of high-end products.

In a manufacturing process of the multi-layer ceramic capacitor, internal electrode layers become finer with an increasing of a number of stacked layers of the internal electrode layers of the multi-layer ceramic capacitor. However, metal particles in the internal electrode layers are easily sphered due to heat energy of high temperature applied during a sintering process. Accordingly, the spheroidization defects result in discontinuous of the internal electrode layers, and further the capacitance characteristics of the multi-layer ceramic capacitor are reduced.

In view of this, there is an urgent need to provide a multi-layer ceramic capacitor and a method for producing the same, thereby improving the spheroidization defects of the conventional multi-layer ceramic capacitor and its manufacturing method.

SUMMARY

Therefore, an aspect of the present application is to provide a method for producing a multi-layer ceramic capacitor. Internal electrode layers of the multi-layer ceramic capacitor are formed from specific metal particles, and thereby the continuity of the internal electrodes of the multi-layer ceramic capacitor is efficiently enhanced.

Another aspect of the present application is to provide a multi-layer ceramic capacitor. The multi-layer ceramic capacitor is produced by the aforementioned method.

According to an aspect of the present application, a method for producing a multi-layer ceramic capacitor is provided. A plurality of internal electrode layers and a plurality of ceramic dielectric layers are firstly formed. Each of the internal electrode layers is formed from a plurality of metal particles, and each of the metal particles includes a nickel metal core and an oxidized metal layer completely covering the nickel metal core. Then, the internal electrode layers and the ceramic dielectric layers are alternately laminated to form a laminated stack. Next, a sintering process is performed to the laminated stack to form a laminated ceramic body. During the sintering process, a low temperature burn-out step is firstly performed, and then a high temperature sintering step is performed. The oxidized metal layer of each of the metal particles is reduced to a metal layer during the high temperature sintering step. After the sintering process is performed, a terminal electrode is respectively formed on two ends of the laminated ceramic body to obtain the multi-layer ceramic capacitor.

According to some embodiments of the present application, during a method for forming the aforementioned metal particles, a misted solution is firstly applied as a carrier for the nickel metal core. Next, a film-forming process is performed to the misted solution containing the nickel metal core to form the oxidized metal layer. After the oxidized metal layer is formed, a magnetic filtering process is performed to obtain the metal particles.

According to some embodiments of the present application, the aforementioned misted solution includes a compound containing a metal atom corresponding to the oxidized metal layer.

According to some embodiments of the present application, a thickness of the aforementioned oxidized metal layer is 1 nm to 50 nm.

According to some embodiments of the present application, the aforementioned oxidized metal layer includes stannous oxide, stannic oxide or a combination thereof, and the metal layer includes tin metal.

According to some embodiments of the present application, the aforementioned internal electrode layers are not treated in a reducing environment before the high temperature sintering step is performed.

According to some embodiments of the present application, an oxygen partial pressure of the aforementioned reducing environment is not greater than $10^{-10}$ MPa.

According to some embodiments of the present application, a temperature of the aforementioned reducing environment is not lower than 1000° C.

According to some embodiments of the present application, an oxygen partial pressure in the aforementioned high temperature sintering step is $10^{-12}$ MPa to $10^{-10}$ MPa.

According to some embodiments of the present application, during the aforementioned high temperature sintering step, a heating stage is firstly performed, and a heating rate of the heating stage is not less than 30° C./min. Next, a soaking stage is performed, and a soaking period of the soaking stage is not longer than 50 minutes. And then, a cooling stage is performed, and a cooling rate of the cooling stage is not less than 10° C./min.

According to some embodiments of the present application, an oxygen vacancy is formed in each of the aforementioned ceramic dielectric layers during the high temperature sintering step, and the oxygen vacancy is adjacent to an interface between each of the ceramic dielectric layers and each of the internal electrode layers.

According to some embodiments of the present application, a thickness of the aforementioned oxygen vacancy in each of the ceramic dielectric layers is 10 nm to 100 nm, measured from the interface.

According to some embodiments of the present application, the aforementioned interface forms a Schottky barrier.

According to another aspect of the present application, a multi-layer ceramic capacitor produced by the aforementioned method is provided. The multi-layer ceramic capacitor comprises a laminated ceramic body and two terminal electrodes. The laminated ceramic body comprises a plurality of internal electrode layers and a plurality of ceramic dielectric layers. The internal electrode layers and the ceramic dielectric layers are stacked alternately. The terminal electrodes are respectively disposed on two ends of the laminated ceramic body. The multi-layer ceramic capacitor has continuity of the internal electrode not less than 85%.

According to some embodiments of the present application, each of the aforementioned ceramic dielectric layers has an oxygen vacancy, and the oxygen vacancy is adjacent to an interface between each of the ceramic dielectric layers and each of the internal electrode layers.

According to some embodiments of the present application, a thickness of the aforementioned oxygen vacancy in each of the ceramic dielectric layers is 10 nm to 100 nm, measured from the interface.

According to some embodiments of the present application, the aforementioned interface is a Schottky barrier.

According to another aspect of the present application, a multi-layer ceramic capacitor is provided. The multi-layer ceramic capacitor comprises a laminated ceramic body and two terminal electrodes. The laminated ceramic body comprises a plurality of internal electrode layers and a plurality of ceramic dielectric layers, and the internal electrode layers and the ceramic dielectric layers are stacked alternately. The internal electrode layers include a plurality of Ni—Sn alloy particles. Each of the ceramic dielectric layers includes two semiconductor surfaces respectively adjacent to the internal electrode layers. The terminal electrodes are respectively disposed on two ends of the laminated ceramic body. The multi-layer ceramic capacitor has continuity of the internal electrode not less than 85%.

According to some embodiments of the present application, each of the aforementioned Ni—Sn alloy particles includes a nickel metal core completely covering with a tin metal layer.

According to some embodiments of the present application, each of the aforementioned semiconductor surfaces includes trivalent titanium atom.

In the multi-layer ceramic capacitor and the method for producing the same of the present application, the internal electrode layers are formed from the metal particles comprising the nickel core and the oxidized metal layer, and the oxidized metal layer is reduced with the following sintering process. Accordingly, the internal electrode layers formed from the nickel alloy materials can be produced, and a difference of the shrinking ratios between the internal electrode layer and the ceramic dielectric layer can be further decreased, and therefore the continuity of the internal electrode of the multi-layer ceramic capacitor can be improved. Further, the specific nickel alloy particles of the present application facilitate to subject the ceramic dielectric layers to form a semiconductor region, such that the interface between the internal electrode layer and the ceramic dielectric layer can efficiently suppress leakage currents, and therefore the long-term reliability of the multi-layer ceramic capacitor is further improved. Thus, the multi-layer ceramic capacitor of the present application has better capacitance characteristics and reliability.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
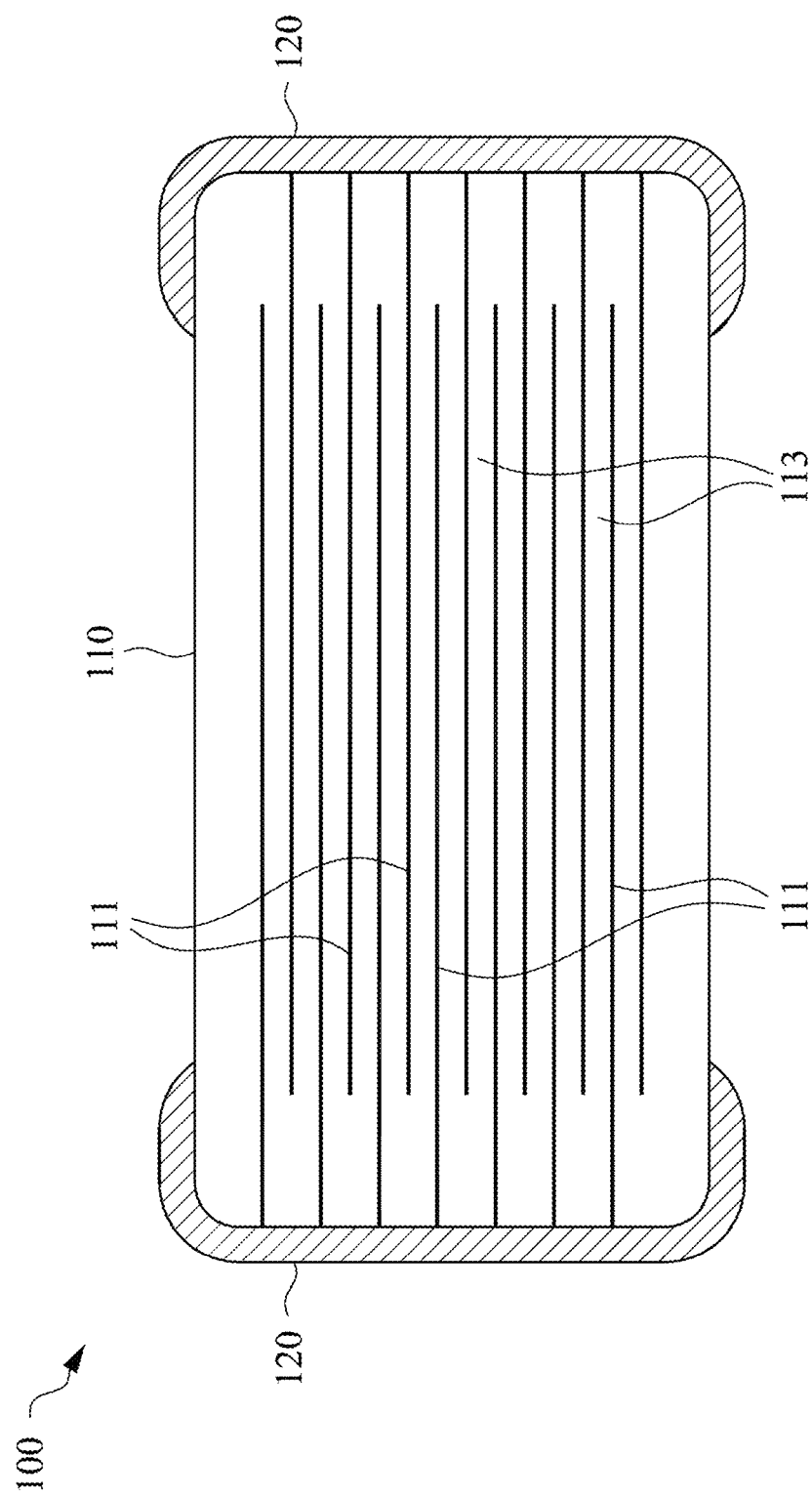
FIG. 1 illustrates a cross-sectional view of a multi-layer ceramic capacitor according to some embodiments of the present application.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, it illustrates a cross-sectional view of a multi-layer ceramic capacitor according to some embodiments of the present application. The multi-layer ceramic capacitor (MLCC) 100 of the present application comprises a laminated ceramic body 110 and two terminal electrodes 120, and these terminal electrodes 120 are disposed on two ends of the laminated ceramic body 110. The laminated ceramic body 110 includes a plurality of internal electrode layers 111 and a plurality of ceramic dielectric layers 113, and the internal electrode layers 111 and the ceramic dielectric layers 113 are alternately disposed. A portion of the internal electrode layers 111 is electrically connected to one of the terminal electrodes 120, and the remaining portion of the internal electrode layers 111 is electrically connected to the other terminal electrodes 120. Accordingly, the multi-layer ceramic capacitor 100 of the present application has higher capacitance and better operability, thereby meeting the application requirements of high-end products. Besides, the multi-layer ceramic capacitor 100 of the present application has a continuity of the internal electrode not less than 85%, and further the reliability of the multi-layer ceramic capacitor 100 can be improved.

Figure 2:
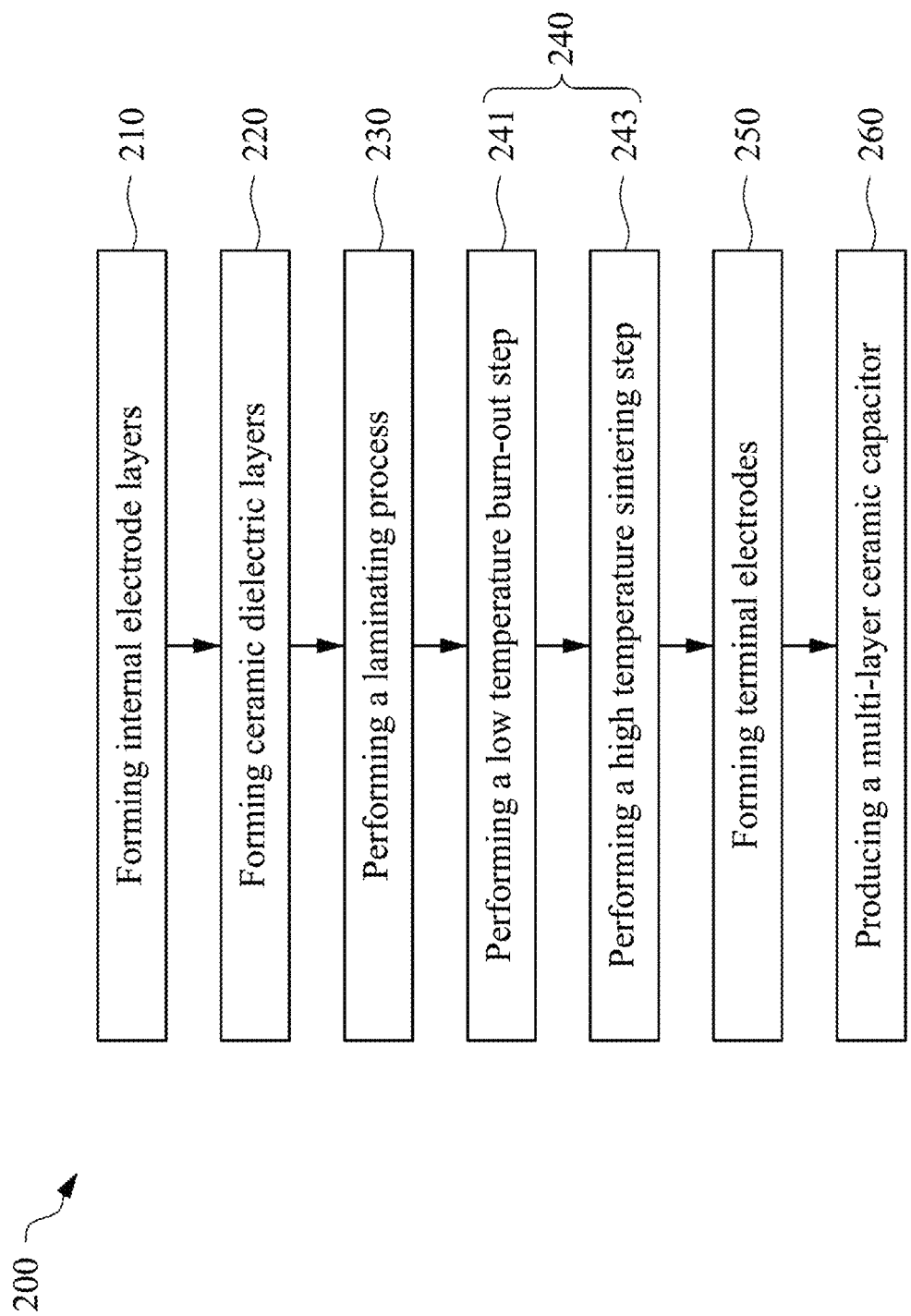
FIG. 2 illustrates a flow chart of a method for producing a multi-layer ceramic capacitor according to some embodiments of the present application.

Referring to FIG. 1 together with FIG. 2, and FIG. 2 illustrates a flow chart of a method for producing the multi-layer ceramic capacitor 100 according to some embodiments of the present application. In the method 200, firstly, a plurality of internal electrode layers 111 are formed, and a plurality of ceramic dielectric layers 113 are formed, shown as operation 210 and operation 220 respectively. It can be realized that there are not limitations to the order of the forming of the internal electrode layers 111 and the ceramic dielectric layers 113 as long as the forming of those layers can simultaneously be performed. In other words, the orders of the operation 210 and operation 220 are not limited to that shown in FIG. 2. The operation 220 can be firstly performed, and then the operation 210 is performed. Alternatively, the operation 210 and the operation 220 are simultaneously performed.

In operation 210, the internal electrode layers 111 are formed from a plurality of metal particles, and each of the metal particles includes a nickel metal core and an oxidized metal layer. The oxidized metal layer completely covers the nickel metal core. The metal particles used to produce the internal electrode layers 111 can be prepared by the following method.

Firstly, nickel metal particles are dispersed in a solvent to form a nickel-containing solution. Then, a nebulizing process is performed to the nickel-containing solution to nebulize the solvent in the nickel-containing solution, and therefore the nickel metal particles are covered by the misted solvent, and the misted solvent is applied as a carrier of the nickel metal particles. There are not limitations to the misted solvent as long as it can be nebulized well and be effectively removed in a subsequent film-forming process. In some embodiments, based on the following film-forming process, the aforementioned solvent can or cannot include a compound for forming the oxidized metal layer, in which the compound includes metal atoms corresponding to the oxidized metal layer. For example, the solvent can include but be not limited to n-butyl acetate, ethanol, other suitable solvents, or a combination thereof, and the solvent may contain the compound used to form the oxidized metal layer, or not. In some embodiments, the nebulizing process can be performed with an ultrasonic nebulizing device, other devices capable of nebulizing the solvent, or a combination thereof. In some embodiments, a particle size of the nickel metal particles is 100 nm to 200 nm, and preferably is 120 nm to 180 nm. When the particle size of the nickel metal particles is within the aforementioned range, the nickel metal particles is much well covered by the oxidized metal layer formed in the subsequent film-forming process, thereby facilitating to improve the continuity of the internal electrode of the obtained internal electrode layers 111.

In some embodiments, an another gas is selectively applied as the carrier gas for the movement of the nickel metal particles, such that the movement of the nickel metal particles covered with the misted solvent is much easily operated. In these embodiments, the gas applied as the carrier gas is a pure substance or a mixed gas. There are not limitations to the selection of the gas as long as the nickel metal particles coated with the misted solvent can be carried with the gas and does not react with it. In some examples, the gas can include but be not limited to nitrogen, oxygen, argon, other suitable gases, or a combination thereof.

After the aforementioned nebulizing process is performed, the nickel metal particles coated with the misted solvent are introduced into a reactor to perform the film-forming process to form the oxidized metal layer covering the nickel metal core.

When the film-forming process is performed and the solvent includes the compound used to form the oxidized metal layer, high temperature of the reactor induces the compound to be reacted to form the oxidized metal layer covering the nickel metal particles and subjects other components in the solvent to be removed. When the film-forming process is performed and the compound used to form the oxidized metal layer is not included in the solvent, the solvent is firstly removed with high temperature of the reactor, and then the compound is introduced into the reactor to be reacted to form the oxidized metal layer on a surface of the nickel metal particles. In some examples, the oxidized metal layer can include tin oxides (such as, stannic oxide ($SnO_2$) or stannous oxide (SnO)), other suitable metal oxides, or a combination thereof. For example, when the oxidized metal layer includes the tin oxides ($SnO_2$ and/or SnO), the corresponding compound can include tetramethyl tin (TMT), tin tetrahalide hydrate (such as tin tetrachloride hydrate ($SnCl_4 \cdot 5H_2O$)), other suitable tin-containing compounds, or a combination thereof. In some embodiments, a thickness of the oxidized metal layer is 1 nm to 50 nm, and preferably is 15 nm to 30 nm. When the thickness of the oxidized metal layer is within the aforementioned range, the formed internal electrode layer 111 has a lower shrinking ratio during the sintering process, and further it facilitates to improve flatness of the internal electrode layer 111, therefore enhancing the continuity of the internal electrode of the internal electrode layer 111.

After the oxidized metal layer is formed, a magnetic filtering process is performed to obtain the metal particles for forming the internal electrode layers 111. The obtained metal particles are further ball-milled with a binder (such as polyvinyl butyral based binder) and an organic solvent (such as ethanol), and the internal electrode layer 111 is obtained after molding.

Continuously referring to FIG. 1 and FIG. 2. In operation 220, there are not limitations to the method for producing the ceramic dielectric layers 113 of the present application, and the ceramic dielectric layers 113 can be produced by methods and processes well known to one skilled in the art. For example, the ceramic dielectric layers 113 can be produced by the process described below. $BaCO_3$ and $TiO_2$ are weighed as raw materials for perovskite containing Ba and Ti. Then, the raw materials are subjected to ball milling and heat treatment to obtain barium titanate-based perovskite powder as a main component of the ceramic dielectric layers 113. Next, powders (such as $Dy_2O_3$, $Y_2O_3$, MgO, MnO and SiO) and the aforementioned barium titanate-based perovskite powder are ball milled. After the powders are uniformly mixed and dried, the raw material powder of the ceramic dielectric layers 113 is obtained. And then, the raw material powder is ball milled with an organic solvent (such as ethanol) to obtain a raw material slurry, and a molding process is performed with a scraper to obtain a green sheet of the ceramic dielectric layers 113 with a thickness of 0.8 µm to 4 µm. Preferably, the thickness of the ceramic dielectric layers 113 is 0.8 µm to 1.5 µm. For example, the thickness of the ceramic dielectric layers 113 is about 0.8 µm.

After the internal electrode layers 111 and the ceramic dielectric layers 113 are formed, the internal electrode layers 111 and the ceramic dielectric layers 113 are alternately stacked to perform a laminating process to form a laminated stack, shown as operation 230. When the laminating process is performed, the internal electrode layers 111 and the ceramic dielectric layers 113 are alternately laminated, and one of the internal electrode layers 111 and the adjacent one extend along opposite directions. Two adjacent internal electrode layers 111 are electrically insulated due to the separation of the ceramic dielectric layers 113 between those.

After the operation 230 is performed, a sintering process 240 is performed to the laminated stack to form the laminated ceramic body 110. In the sintering process 240, a low temperature burn-out step is firstly performed, and then a high temperature sintering step is performed, respectively shown as operation 241 and operation 243. When the low temperature burn-out step is performed, the binder and the organic solvent in the internal electrode layers 111 and the ceramic dielectric layers 113 are burned out. In some embodiments, the low temperature burn-out step is performed at 280° C. to 600° C., and preferably at 300° ° C. to 500° C. It should be noted that when the low temperature burn-out step is performed, the oxidized metal layers of the metal particles in the internal electrode layers 111 remain in an oxidized state rather than being reduced due to low temperature and a nitrogen environment (oxygen partial pressure is about $10^{-7}$ MPa to $10^{-9}$ MPa) of the low temperature burn-out step.

The high temperature sintering step is performed at a sintering temperature not lower than 1000° C. and an environment with an oxygen partial pressure not greater than $10^{-10}$ MPa. With sintering conditions of high temperature and low oxygen content, the oxidized metal layers of the metal particles in the internal electrode layers 111 are reduced to corresponding metal atoms. Because the nickel metal particle is completely covered by the oxidized metal layer, it is still completely covered by the reduced metal atoms obtained by the high temperature sintering step, and thereby a nickel alloy is obtained. For example, when the oxidized metal layer includes the tin oxides (such as $SnO_2$ or SnO), it is reduced to tin metal during the high temperature sintering step, and thereby the tin metal forms a Ni—Sn alloy material with the nickel metal particle. With the reduction reaction induced by the high temperature sintering step, the obtained alloy material in the internal electrode layer 111 can efficiently decrease a difference of shrinking ratios between the internal electrode layer 111 and the ceramic dielectric layer 113, thereby efficiently enhancing the continuity of the internal electrodes of the laminated ceramic body 110, and further the reliability and capacitance characteristics of the multi-layer ceramic capacitor 100 are improved. In some embodiments, the temperature of the high temperature sintering step is preferably 1120° C. to 1180° C. The high temperature sintering step is performed in an environment with an oxygen partial pressure of $10^{-12}$ MPa to $10^{-10}$ MPa for efficiently improving the reactivity of the aforementioned reduction reaction. If the reduction reaction subjected to the oxidized metal layer is not induced by the high temperature sintering step, the metal particles covered by the oxidized metal layer will increase the difference of the shrinking ratios between the internal electrode layer 111 and the ceramic dielectric layer 113, thereby substantially reducing the continuity of the internal electrodes of the laminated ceramic body 110, and therefore the reliability and capacitance characteristics of the multi-layer ceramic capacitor 100 are reduced.

In some embodiments, when the high temperature sintering step is performed, the laminated ceramic body 110 is firstly heated to the sintering temperature with a rate not less than 30° C./min, and then be soaked for a period of time (such as not longer than 50 minutes) at the sintering temperature for further improving the continuity of the internal electrodes of the laminated ceramic body 110. Next, the laminated ceramic body 110 is cooled with a rate not less than 10° C./min. The difference of the shrinking ratios between the internal electrode layer 111 and the ceramic dielectric layer 113 can be further reduced by the rapid heating rate and the shorter soaking period, such that the continuity of the internal electrodes of the laminated ceramic body 110 is efficiently improved. In some embodiments, the laminated ceramic body 110 is preferably heated to the sintering temperature with a rate of 30° C./min to 100° C./min during the high temperature sintering step.

In some embodiments, before the high temperature sintering step is performed, the metal particles in the internal electrode layers 111 are not treated in a reducing environment to prevent the oxidized metal layers from being reduced to metal atoms for ensuring that the nickel metal particles are covered by the oxidized metal layers. In some embodiments, a temperature of the reducing environment is not lower than 1000° C., and an oxygen content thereof is not more than $10^{-10}$ MPa. In other words, the nickel metal particles are preferably processed or placed in a low reducing environment before the high temperature sintering step is performed. In some embodiments, the oxygen content of the low reducing environment is $10^{-10}$ MPa to $10^{-12}$ MPa, and the temperature thereof is 1100° ° C. to 1200° C. When the oxygen content of the low reducing environment is within the range, the oxidized metal layer of the metal particles not only maintains in the oxidation state, but also the nickel metal particles covered by the oxidized metal layers are hard to be oxidized. Therefore, the capacitance characteristics of the obtained multi-layer ceramic capacitor 100 can be maintained, and it facilitates to improve the continuity of the internal electrodes.

Continuously referring to FIG. 1 and FIG. 2. After the sintering process 240 is performed, terminal electrodes 120 are respectively formed on two ends of the laminated ceramic body 110 to produce the multi-layer ceramic capacitor 100, shown as operation 250 and operation 260. The multi-layer ceramic capacitor 100 has the continuity of the internal electrode not less than 85%, and therefore it has better capacitance characteristics and reliability.

Several embodiments are described below to illustrate the application of the present application. However, these embodiments are not used for limiting the present application. For those skilled in the art of the present application, various variations and modifications can be made without departing from the spirit and scope of the present application.

Embodiment 1

Nickel metal particles with a particle size of 120 nm were firstly dispersed in n-butyl acetate, and an ultrasonic nebulizing device was applied to produce nickel metal particles coated with misted n-butyl acetate. A diameter of the misted liquid droplets of n-butyl acetate was about several micrometers to tens of micrometers, such that the nickel metal particles were completely covered by the misted liquid droplets of n-butyl acetate. Then, a mixed gas containing nitrogen gas and oxygen gas was introduced to be used as a carrier of the nickel metal particles with the misted n-butyl acetate, and further the nickel metal particles were introduced into a low pressure reactor (about $10^{-1}$ torr) with the carrier, in which tetramethyl tin had been introduced in the reactor. The reactor was equipped with a heating element and a plasma generating element, and the heating element was disposed adjacent to a gas inlet port of the reactor. The aforementioned mixed gas was introduced into the reactor through the gas inlet port. Therefore, the misted liquid droplets of n-butyl acetate were evaporated due to heat energy applied by the heating element when the mixed gas was introduced into the reactor, and thereby the nickel metal particles were exposed in tetramethyl tin in the reactor. In a plasma region of the reactor, the nickel metal particles reacted with tetramethyl tin to form a tin oxide layer on surfaces of the nickel metal particles, and therefore metal particles of Embodiment 1 were obtained. Next, the metal particles of Embodiment 1 were collected by an electromagnetic filter disposed between an outlet of the reactor and a decompression pump.

Figure 3B:
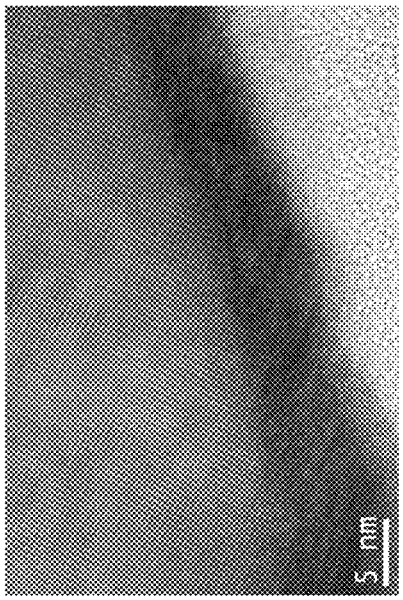
FIG. 3A and FIG. 3B respectively shows a scanning electron micrograph image and a transmission electron micrograph image of metal particles in the internal electrode layer according to Embodiment 1 of the present application.
Figure 3A:
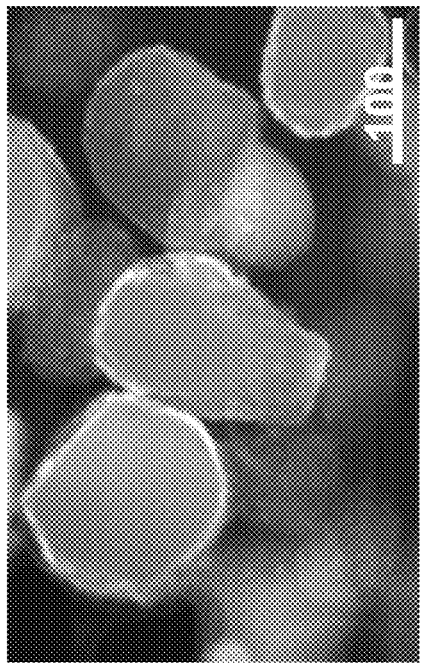
Figure 5B:
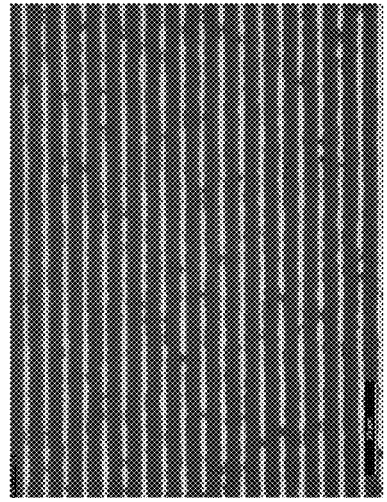
FIG. 5A to FIG. 5D respectively shows a high-magnification cross-sectional optical microscope image of the laminated ceramic body of the multi-layer ceramic capacitor according to Embodiment 1, Embodiment 2, Comparative Embodiment 1, and Comparative Embodiment 2 of the present application.
Figure 5D:
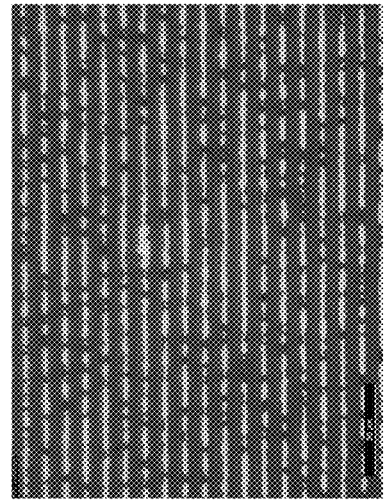
Figure 5A:
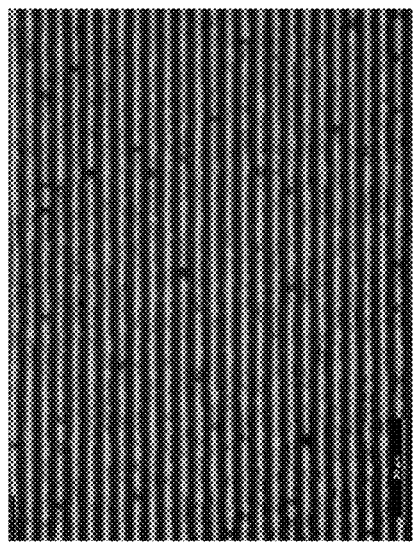
Figure 5C:
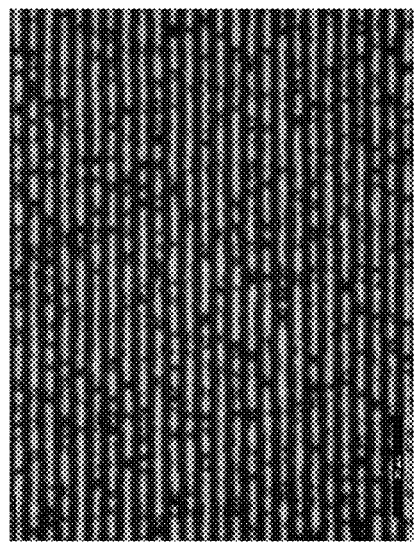

Referring to FIG. 3A and FIG. 3B, and FIG. 3A and FIG. 3B respectively showed a scanning electron micrograph image and a transmission electron micrograph image of metal particles in the internal electrode layer according to Embodiment 1 of the present application. According to FIG. 3A and FIG. 3B, the nickel metal particles were covered by a tin oxide layer with a thickness about 10 nm.

According to the aforementioned method, internal electrode layers of Embodiment 1 were produced by the metal particles, and ceramic dielectric layers of Embodiment 1 were produced. Then, a laminating process was performed to produce a laminated stack of Embodiment 1. Next, the laminated stack was heated to 350° C. to burn out binders in a nitrogen environment, and then the atmosphere was adjusted to a reduced pressure environment with an oxygen partial pressure of $10^{-10}$ MPa to $10^{-12}$ MPa, and further the laminated stack was heated to 1200° C. with a rate of 20° C./min. After it was soaked for 20 minutes, a laminated ceramic body of Embodiment 1 was obtained.

And then, terminal electrodes were formed on two ends of the laminated ceramic body of Embodiment 1 to form the multi-layer ceramic capacitor of Embodiment 1. The obtained multi-layer ceramic capacitor was evaluated according to the following evaluation method of the continuity of the internal electrode, and the result thereof was described as follows.

Embodiment 2

10 wt % of nickel metal particles was firstly dispersed in water with a surfactant, and an ethanol solution (concentration was 0.2 mole/L) including tetrachloride hydrate ($SnCl_4 \cdot 5H_2O$). Then, an ultrasonic nebulizing device was applied to produce nickel metal particles coated with misted liquid droplets. Next, a mixed gas containing nitrogen gas and argon gas was introduced to be used as a carrier of the nickel metal particles with the misted n-butyl acetate, and further the nickel metal particles were introduced into a low pressure reactor (about $10^{-1}$ torr) with the carrier. In the reactor, a tin oxide layer was formed on surfaces of the nickel metal particles by a hydrothermal method, and therefore the metal particles of Embodiment 2 were obtained. And then, the metal particles of Embodiment 2 were collected by an electromagnetic filter.

Figure 4:
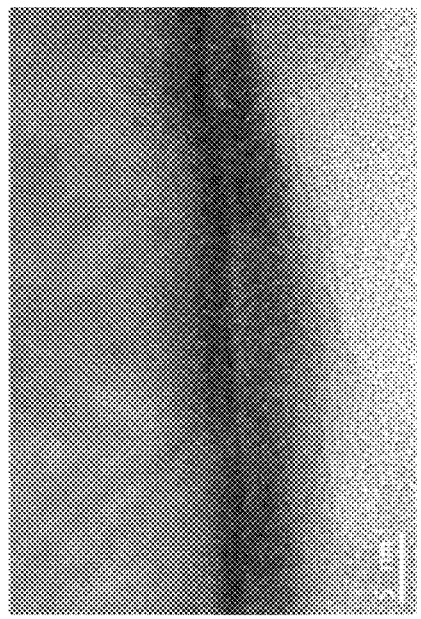
FIG. 4 shows a transmission electron micrograph image of metal particles in the internal electrode layer according to Embodiment 2 of the present application.

Referring to FIG. 4, and it showed a transmission electron micrograph image of metal particles in the internal electrode layer according to Embodiment 2 of the present application. According to FIG. 4, a thickness of the tin oxide layer of the metal particles was about 10 nm.

Next, the multi-layer ceramic capacitor of Embodiment 2 was produced with the same method as in Embodiment 1, and the evaluation results of the continuity of the internal electrodes were described as follows.

Comparative Embodiment 1 and Comparative Embodiment 2

The multi-layer ceramic capacitors of Comparative Embodiment 1 and Comparative Embodiment 2 were produced with the same method as in Embodiment 1. The differences were that the internal electrode layers of the multi-layer ceramic capacitors of Comparative Embodiment 1 and Comparative Embodiment 2 were respectively produced by nickel metal particles blended with barium titanate with a particle size of 30 nm (a content of the nickel metal particles was 5 wt %), in which the adopted nickel metal particles were the metal particles of Embodiment 1 and Embodiment 2 without covering the tin oxide layers. The evaluation results of the continuity of the internal electrodes were described as follows.

Evaluation Method of Continuity of the Internal Electrode

The continuity of the internal electrode of Embodiments 1 and 2 and Comparative Embodiments 1 and 2 were calculated according to the following formula based on high-magnification optical microscope images.

$$\text{continuity of internal electrode} = \frac{(L_t - L_{dc})}{L_t} \times 100\%$$

In the formula, $L_t$ represented a total length of each of the internal electrode layers; $L_{dc}$ represented a sum of lengths of discontinuous portion (such as the portion where was shrunk to be discontinuous due to high temperature sintering) in the internal electrode layers corresponding to $L_t$. The continuity of the internal electrode of the present application was evaluated according to an average of the continuity of the internal electrode of all the internal electrode layers in the multi-layer ceramic capacitor.

Referring to FIG. 5A to FIG. 5D, and FIG. 5A to FIG. 5D respectively showed a high-magnification cross-sectional optical microscope image of the laminated ceramic body of the multi-layer ceramic capacitor according to Embodiment 1, Embodiment 2, Comparative Embodiment 1, and Comparative Embodiment 2 of the present application. Comparing to Comparative Embodiment 1 and Comparative Embodiment 2 (FIG. 5C and FIG. 5D), the internal electrode layers of the multi-layer ceramic capacitors of Embodiment 1 and Embodiment 2 (FIG. 5A and FIG. 5B) had fewer discontinuous portions, and therefore they have better internal electrode continuity. According to the aforementioned evaluation method of internal electrode continuity, the internal electrode continuity of the multi-layer ceramic capacitors of Embodiment 1, Embodiment 2, Comparative Embodiment 1 and Comparative Embodiment 2 were 95%, 93%, 81% and 79%, respectively. Accordingly, the multi-layer ceramic capacitor of the present application had the continuity of internal electrode not less than 85%, thereby effectively improving the capacitance characteristics and reliability of the multi-layer ceramic capacitor, and further the application requirements of high-end products can be met.

Figure 6B:
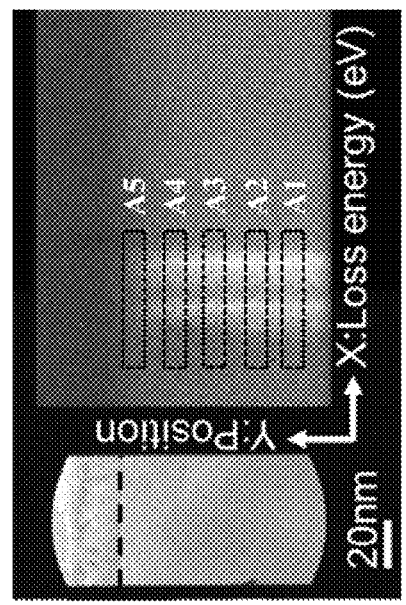
FIG. 6B and FIG. 7B respectively shows an image of spatially resolved electron energy loss spectroscopy of FIG. 6A and FIG. 7A.
Figure 6A:
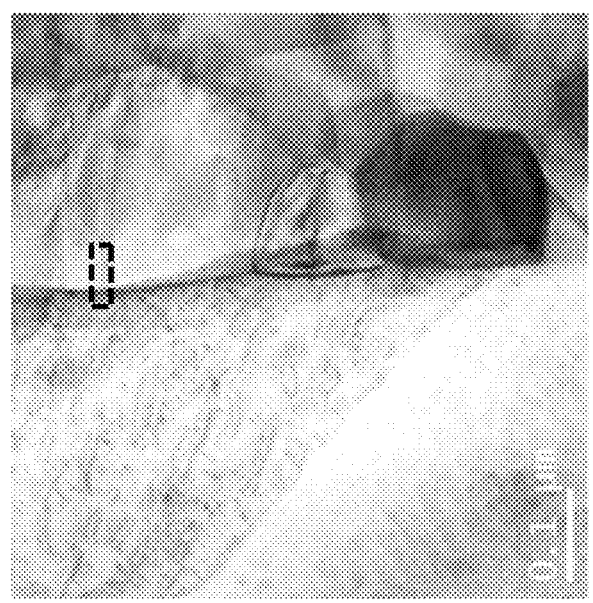
FIG. 6A and FIG. 7A respectively shows a scanning transmission electron micrograph image of the laminated ceramic body of the multi-layer ceramic capacitor according to Embodiment 1 and Comparative Embodiment 1 of the present application.
Figure 7B:
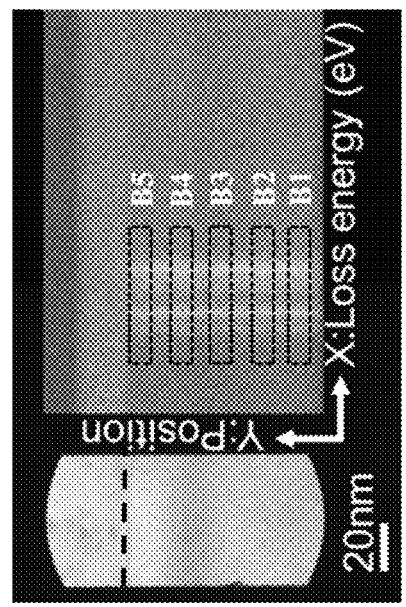
Figure 7A:
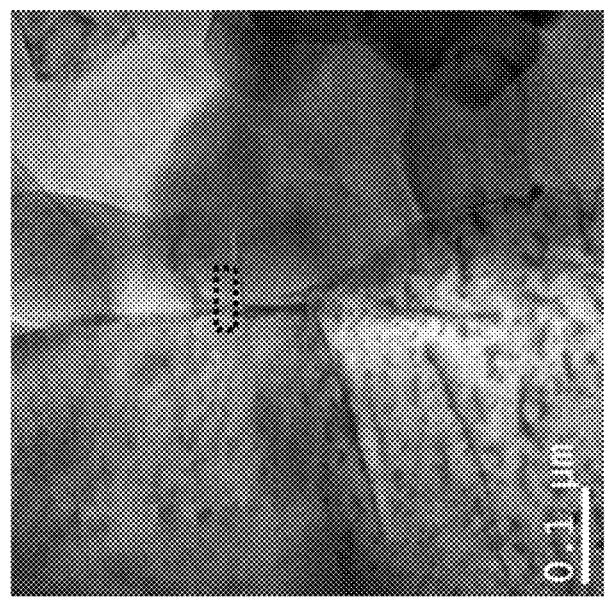

Referring to FIG. 6A, FIG. 6B, FIG. 7A and FIG. 7B, FIG. 6A and FIG. 7A respectively showed a scanning transmission electron micrograph (STEM) image of the laminated ceramic body of the multi-layer ceramic capacitor according to Embodiment 1 and Comparative Embodiment 1 of the present application, and FIG. 6B and FIG. 7B respectively showed an image of spatially resolved electron energy loss spectroscopy (SR-EELS) of FIG. 6A and FIG. 7A.

FIG. 6A and FIG. 7A respectively showed an interface between the internal electrode layer and the ceramic dielectric layer in the laminated ceramic body of Embodiment 1 and Comparative Embodiment 1. Areas marked with dotted line in FIG. 6A and FIG. 7A were analyzed with the electron energy loss spectrum analysis with spatial resolution for further analyzing crystallization characteristics of the internal electrode layer and the ceramic dielectric layer, and the results were respectively shown as FIG. 6B and FIG. 7B. In FIG. 6B and FIG. 7B, images on left sides corresponded to the areas marked with dotted line (i.e. the position corresponding to an analyzed slit of SR-EELS) in FIG. 6A and FIG. 7A, and the dotted lines in the images on left sides represented the interface between the internal electrode layer (upper layer) and the ceramic dielectric layer (lower layer). In FIG. 6B and FIG. 7B, images on right sides were analyzed results obtained by SR-EELS analysis.

Further, the analyzed image of SR-EELS was divided into five regions, which respectively were the regions A1 to A5 and the regions B1 to B5 in FIG. 6B and FIG. 7B. The regions A5 and B5 were adjacent to the interface between the internal electrode layer and the ceramic dielectric layer. Based on the images of FIG. 6B and FIG. 7B, the analyzed results of the region A5 and the region B5 were different. The regions A1 to A5 and the regions B1 to B5 in FIG. 6B and FIG. 7B were further analyzed with Electron Energy-Loss Near-Edge Structures (ELNES) for realizing the differences of the region A5 and the region B5, and the results were respectively shown as FIG. 8A and FIG. 8B.

Figure 8A:
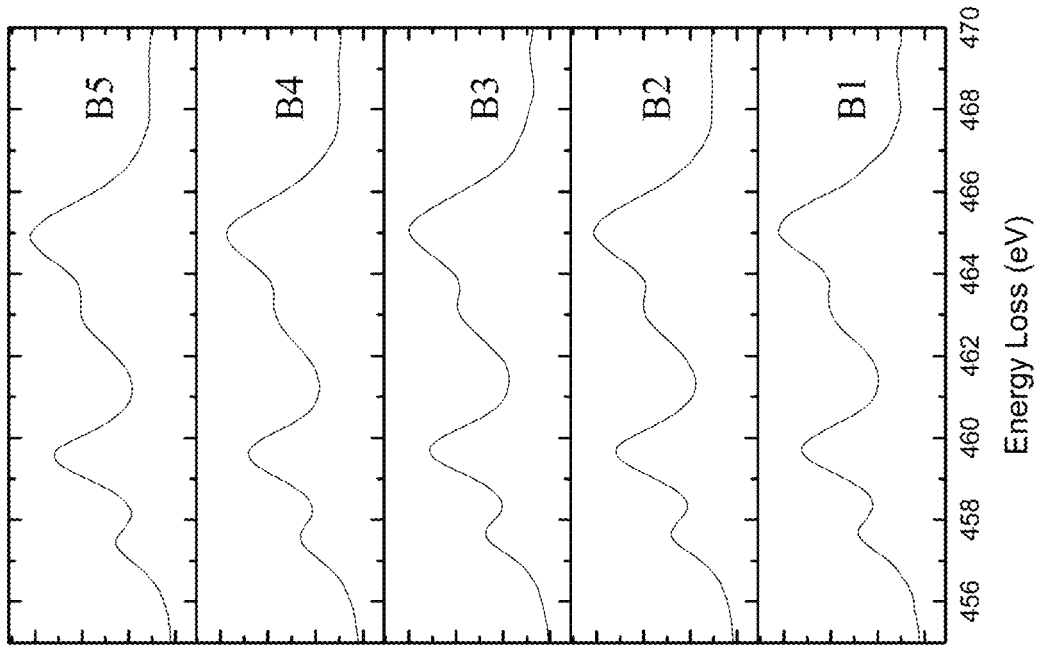
FIG. 8A and FIG. 8B respectively illustrates energy loss near edge structure of FIG. 6B and FIG. 7B.
Figure 8B:
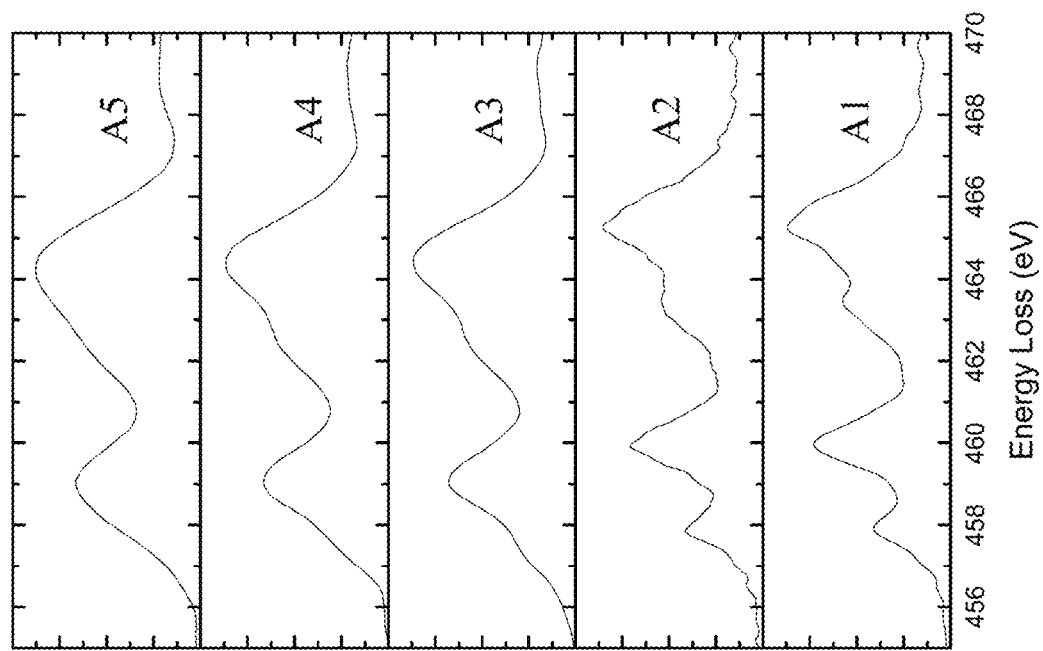

In FIG. 8A and FIG. 8B, there were 4 split peaks in all of the region A1, the region A2 and the region B1 to the region B5, but there were only two signal peaks in the region A3 to the region A5. The variations of the spectrum were due to the formation of oxygen vacancies in the ceramic dielectric layer. The oxygen vacancies caused the titanium atoms in the ceramic dielectric layer to obtain electrons, and thereby $Ti^{4+}$ was reduced to $Ti^{3+}$. Therefore, barium titanate adjacent to the interface between the ceramic dielectric layer and the internal electrode layer could be used as a semiconductor for achieving electron hopping conduction of titanium atoms. Accordingly, electron hopping conduction of $Ti^{4+}$ reducing to $Ti^{3+}$ was achieved due to the oxygen vacancies formed in the ceramic dielectric layer adjacent to the interface, and therefore the interface between the internal electrode layer formed from the specific nickel alloy particles and the ceramic dielectric layer of the present application could be a Schottky barrier which facilitated to suppress leakage currents of the multi-layer ceramic capacitor. In some embodiments, a thickness of the oxygen vacancies in the ceramic dielectric layer was 10 nm to 100 nm, measured from the interface between the internal electrode layer and the ceramic dielectric layer.

Accordingly, the interface between the internal electrode layer and the ceramic dielectric layer of the present application has well flatness, and the specific nickel alloy particles in the internal electrode layer facilitate to subject the interface to form a Schottky barrier, such that they can synergistically improve the long-term reliability of the multi-layer ceramic capacitor, further contributing to enhance the reliability thereof.

As the above, the internal electrode layer of the present application is formed from specific nickel alloy particles, thereby reducing the difference of the shrinking ratios between the internal electrode layer and the ceramic dielectric layer, and further the continuity of the internal electrode layers of the multi-layer ceramic capacitor can be efficiently improved. Therefore, the capacitance characteristics and reliability of multi-layer ceramic capacitor are enhanced. The aforementioned nickel alloy particles are firstly covered with the oxidized metal layers, and then the oxidized metal layers are reduced to the metal layers by the high temperature sintering step of the sintering process, further decreasing the difference of the shrinking ratios between the internal electrode layer and the ceramic dielectric layer. Besides, the internal electrode layers of the present application facilitate the formation of the oxygen vacancies in the ceramic dielectric layers, such that the materials in the ceramic dielectric layers can form semiconductor areas to induce the electron hopping conductions. Thus, the interface between the internal electrode layer and the ceramic dielectric layer of the present application forms a Schottky barrier, further suppressing the generation of leakage currents, such that the long-term reliability of the multi-layer ceramic capacitor can be improved with the synergy of the Schottky barrier and the flatness of the interface.

As is understood by a person skilled in the art, the foregoing preferred embodiments of the present application are illustrated of the present application rather than limiting of the present application. In view of the foregoing, it is intended to cover various modifications and similar arrangements included within the spirit and scope of the appended claims. Therefore, the scope of which should be accorded the broadest interpretation so as to encompass all such modifications and similar structure.

What is claimed is:

1. A multi-layer ceramic capacitor, wherein the multi-layer ceramic capacitor comprises:
    a laminated ceramic body, comprising:
        a plurality of internal electrode layers; and
        a plurality of ceramic dielectric layers, wherein the internal electrode layers and the ceramic dielectric layers are stacked alternately;
    two terminal electrodes, respectively disposed on two ends of the laminated ceramic body, and
    wherein the multi-layer ceramic capacitor has continuity of the internal electrode not less than 85%, wherein each of the ceramic dielectric layers has an oxygen vacancy, and the oxygen vacancy is adjacent to an interface between each of the ceramic dielectric layers and each of the internal electrode layers.

2. The multi-layer ceramic capacitor of claim 1, wherein a thickness of the oxygen vacancy in each of the ceramic dielectric layers is 10 nm to 100 nm, measured from the interface.

3. The multi-layer ceramic capacitor of claim 1, wherein the interface is a Schottky barrier.

* * * * *